(12) United States Patent
Hirsch et al.

(10) Patent No.: US 7,789,446 B2
(45) Date of Patent: Sep. 7, 2010

(54) MOVEABLE STORAGE ASSEMBLY FOR MOTOR VEHICLES

(75) Inventors: Brian Hirsch, Sierra Madre, CA (US); Lluis Penalver-Aguila, Sierra Madre, CA (US); Laura Rose Semo Scharfman, Sierra Madre, CA (US); Joshua Sztul, New York, NY (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 388 days.

(21) Appl. No.: 11/956,511

(22) Filed: Dec. 14, 2007

(65) Prior Publication Data

US 2008/0164708 A1 Jul. 10, 2008

Related U.S. Application Data

(60) Provisional application No. 60/883,543, filed on Jan. 5, 2007.

(51) Int. Cl.
*B60J 7/00* (2006.01)

(52) U.S. Cl. .................. 296/37.8; 296/190.08

(58) Field of Classification Search ............ 296/190.08, 296/190.1, 37.1, 37.7, 37.8, 24.32, 24.3; 312/249.1

See application file for complete search history.

(56) References Cited

U.S. PATENT DOCUMENTS

| 6,983,979 B2 * | 1/2006 | Rasmussen | 296/156 |
| 6,983,980 B2 * | 1/2006 | Rasmussen | 296/156 |
| 6,988,760 B2 * | 1/2006 | Rasmussen | 296/156 |
| 7,121,612 B2 * | 10/2006 | Rasmussen | 296/156 |
| 7,121,613 B1 * | 10/2006 | Rasmussen | 296/156 |

* cited by examiner

*Primary Examiner*—Joseph D Pape
(74) *Attorney, Agent, or Firm*—Jeffrey P. Calfa; Mark C. Bach (57) ABSTRACT

The moveable storage assembly of the invention is well suited to vehicles with tall ceilings, such as a truck cab. The storage assembly has a storage unit attached to guide assemblies. The guide assemblies allow the storage unit to move on guide rails from a retracted to an extended position for easy access to items within the storage unit. The guide assemblies have guides slidingly engaging the guide rails and end brackets at each end of the guide rail. A linear actuator attached to the storage unit moves the storage unit on the guide rails.

12 Claims, 8 Drawing Sheets

MOVEABLE STORAGE ASSEMBLY FOR MOTOR VEHICLES

PRIORITY

The present application claims the benefit of U.S. Provisional Application No. 60/883,543 filed on Jan. 5, 2007.

BACKGROUND OF THE INVENTION

1. Field of the Invention

The present invention relates to a moveable storage assembly, especially for vehicles with a tall ceiling such as truck cabs.

2. Description of the Prior Art

Long haul trucking plays a major role in North American shipping. For economy and convenience, long haul truck cabs often have sleepers, semi-enclosed sections of the vehicle cabs extending behind the operator section of the cab. The use of a sleeper on a truck allows the driver to rest and sleep when on the road and away from home. Sleepers typically include one or more bunks for sleeping, and sometimes storage cabinets, closets, tables, chairs, and the like.

Living space is at a premium in these cabs. The length of the cab is severely limited by legal limitations on the overall length of vehicles and the need to protect the swing clearance area for a trailer attached to the truck tractor's fifth wheel. In addition, the furniture located within the sleeper section must meet various performance requirements associated with the proper operation of the vehicle. Storage cabinets, beds and other furniture must meet various crash test standards in order to protect a vulnerable occupant in the cab during a crash.

Furthermore, the space in motor vehicles is frequently poorly used. In a truck cab, the space is cramped and fails to fulfill the user's needs in terms of the emotional value, identity, ergonomics, or aesthetics. A major complaint is a lack of easily accessible storage for personal belongings. The available storage cabinets and closets are often poorly organized and inaccessible. This results in a cluttered, unorganized living space. In trucks with airfoils having extra head space, most of the head space is unused. These conditions failure can contribute to the high turnover rate of drivers.

Therefore, there is a great need to improve the driver's living space, especially for aging long haul truck drivers. Improving the driver's living space can decrease the turnover rate and attract new drivers. There is a need for a better organized living space and available storage for personal belongings.

SUMMARY OF THE INVENTION

According to the invention there is provided a moveable storage assembly which can be used with vehicles, especially vehicles with tall ceilings such as a truck cab. The storage assembly has a storage unit with a top, a bottom, a back and opposite sidewalls. In the top of the storage unit is an actuator opening, through which at least the first part of a linear actuator extends. The linear actuator also has a second part within the storage unit.

The storage unit moves on a wall using a guide assembly. The guide assembly has a guide that attaches to the storage unit. A guide rail slidingly engages the guide. End brackets are attached to the opposite ends of the guide rail, where they can serve as a stop if needed.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
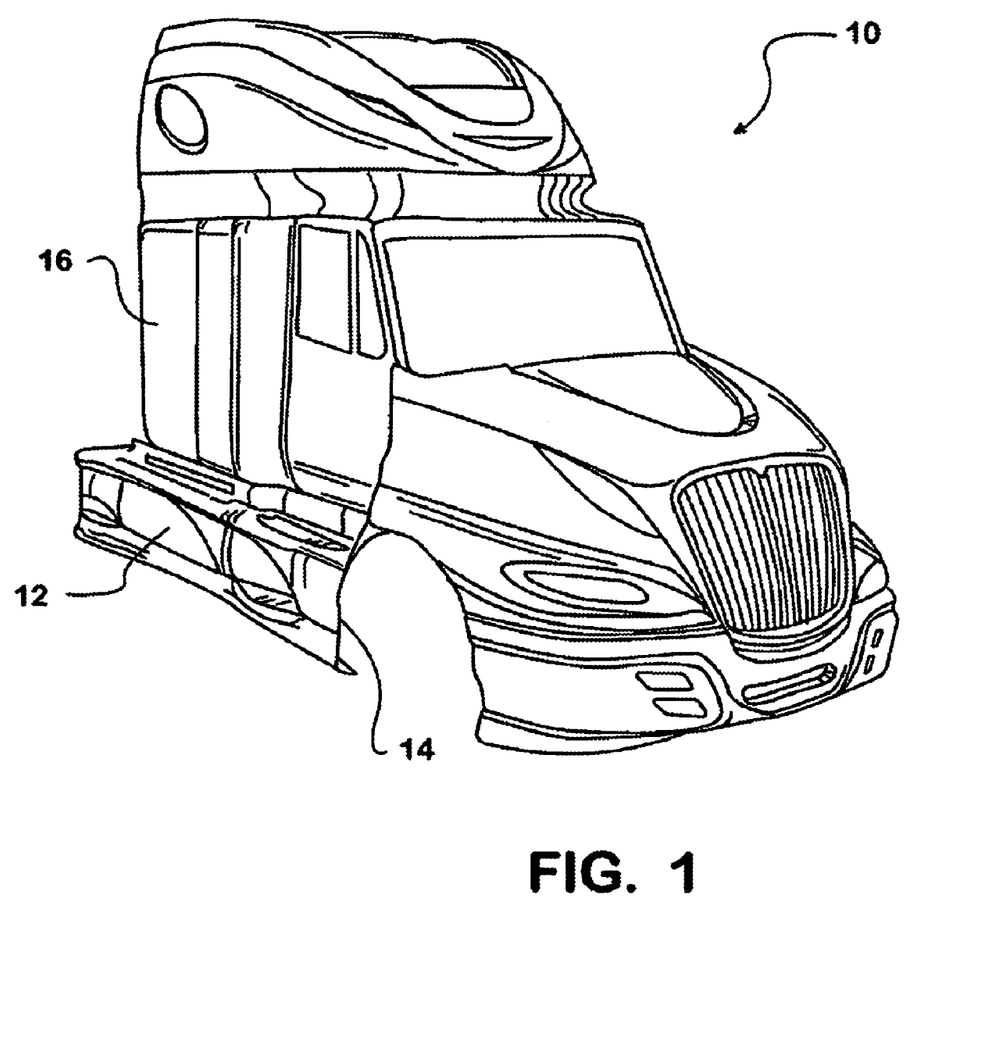
FIG. 1 is a perspective view of a motor vehicle which may have the storage assembly of the invention installed.

Referring now to the figures where like reference numerals refer to like structures, FIG. 1 shows a vehicle 10, such as a truck cab 12, which may have a storage assembly of the invention. The truck cab 12 has a ceiling 13, a front wall 15, a back wall 14 and side walls 16, 17 therebetween to form a cab enclosure 18.

Figure 2:
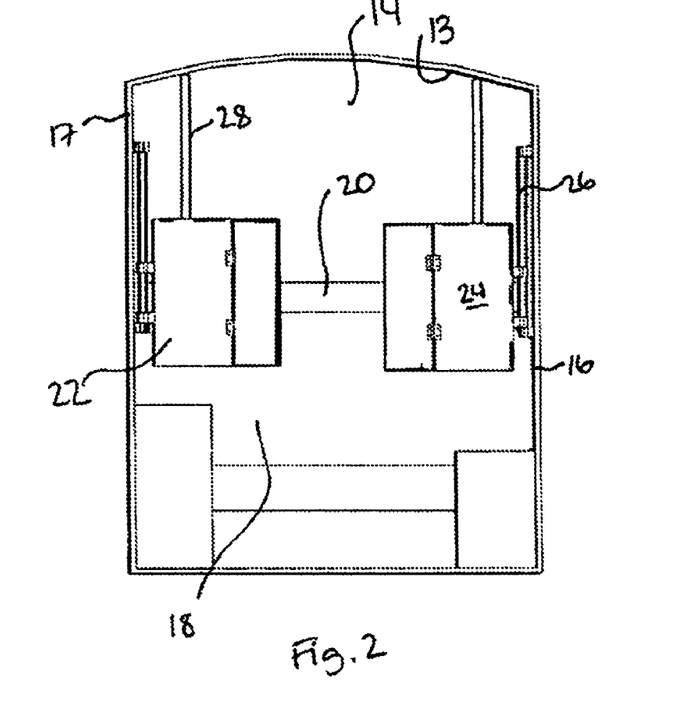
FIG. 2 is a front view representing living space with storage assemblies in one of the embodiments of the invention in the retracted position.
Figure 3:
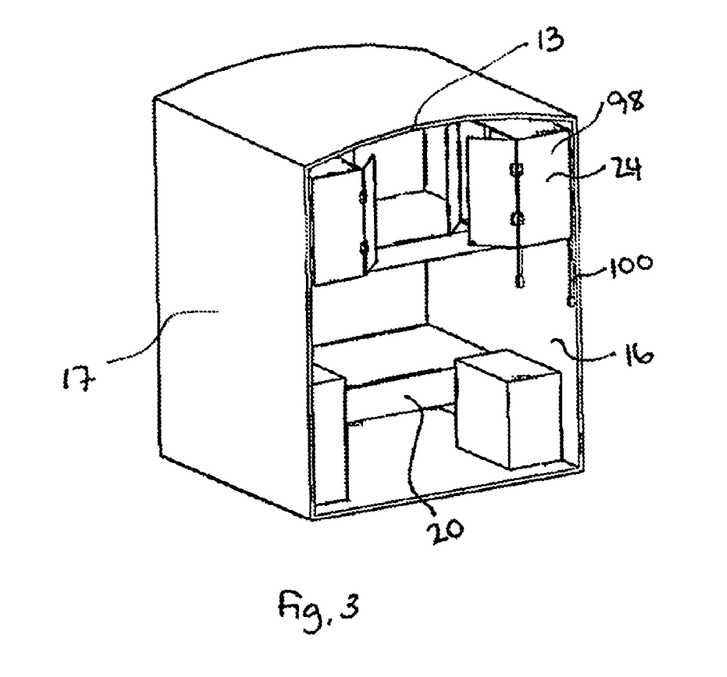
FIG. 3 is a perspective view representing living space with storage assemblies in one of the embodiments of the invention in the extended position.
Figure 4:
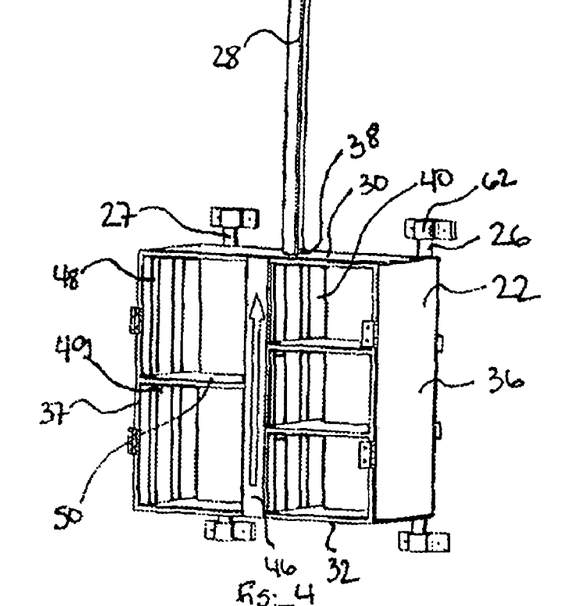
FIG. 4 is a perspective view of a storage assembly in one of the embodiments of the invention with the doors of the storage unit removed.
Figure 5:
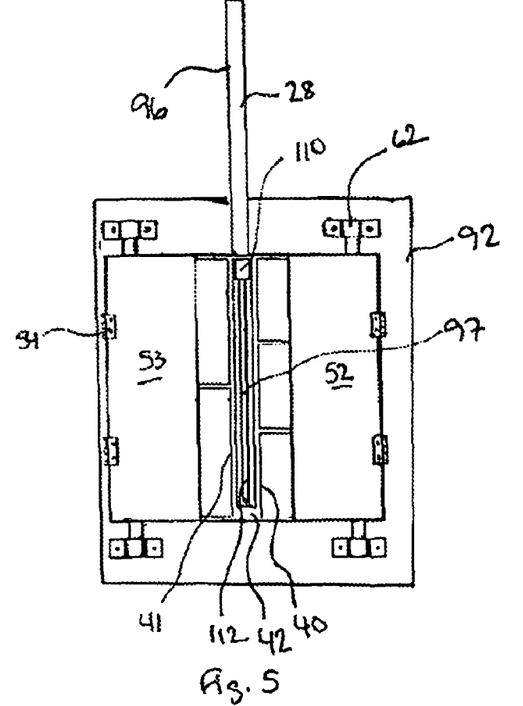
FIG. 5 is a front view of a storage assembly in one of the embodiments of the invention with the doors of the storage unit partially open, the front piece removed and a bracket backing plate mounted to a wall.
Figure 6:
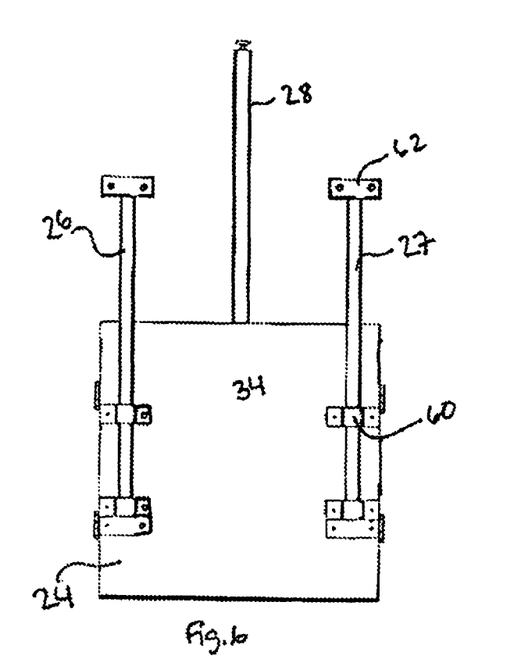
FIG. 6 is a back view of a storage assembly in one of the embodiments of the invention.
Figure 7:
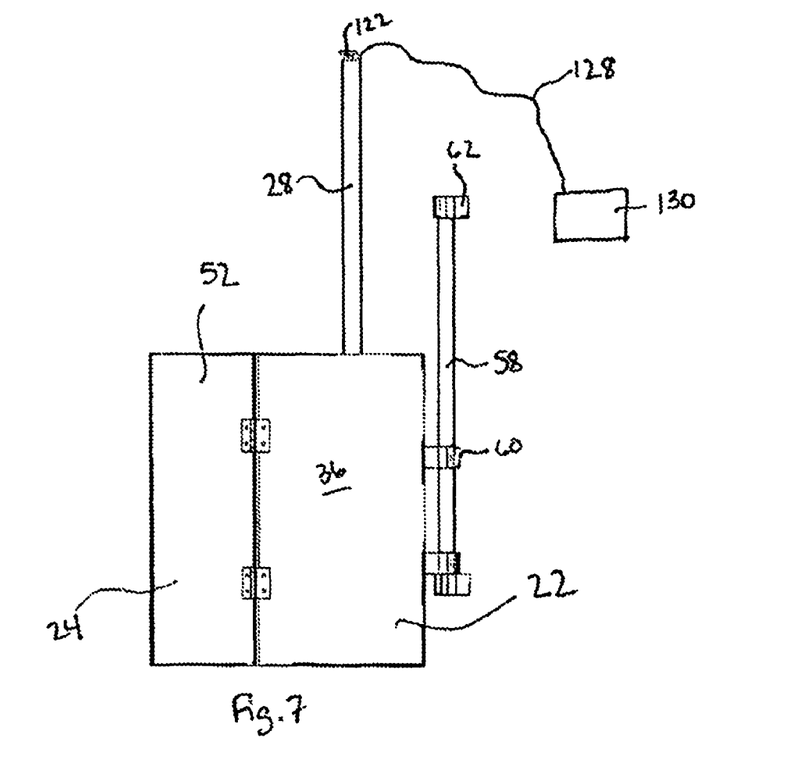
FIG. 7 is a side view of a storage assembly in one of the embodiments of the invention with the doors of the storage unit partially open.
Figure 8:
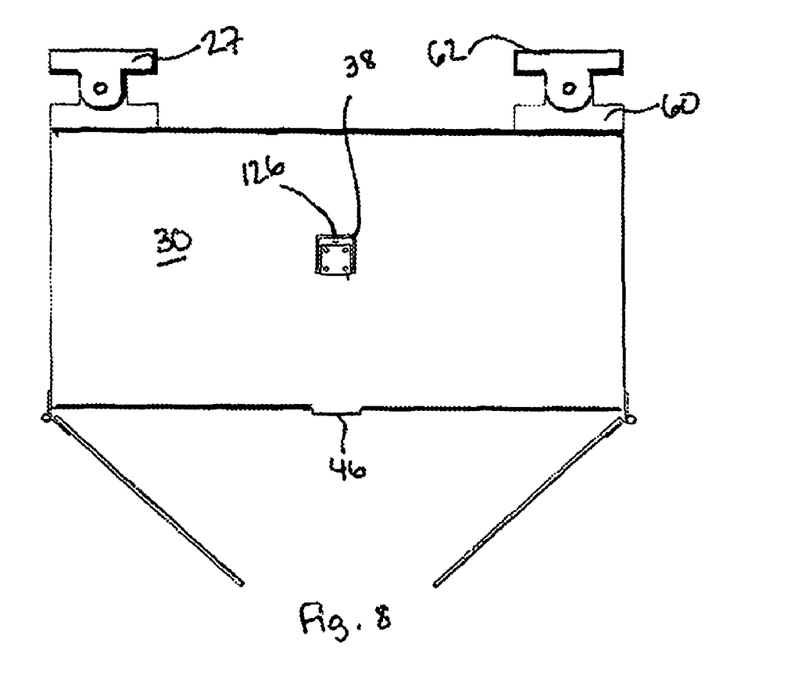
FIG. 8 is a top plan view of a storage assembly in one of the embodiments of the invention with the doors of the storage unit partially open.

Furniture is located within the cab enclosure 18 as represented by FIGS. 2 and 3. A bed 20 is located against the back wall 14 and between the side walls 16, 17. A storage assembly 22 is installed in the cab enclosure 18 on the side cab wall 16 and the ceiling forward the bed 20. The storage assembly 22 has a storage unit 24, a guide assembly 26 attached to storage unit 24 and a linear actuator 28 engaging the storage unit 24.

The storage unit 24 has a top 30, a bottom 32, a back 34 and opposite sidewalls 36, 37. At least part of the linear actuator 28 extends vertically through an actuator opening 38 in the top of the storage unit 24.

In this disclosure, when the storage unit 24 is fully closed and located near the top of the ceiling, the storage unit is in a "retracted position". When the storage unit 24 is at its lowest point, the storage unit 24 is in an "extended position".

Figure 13:
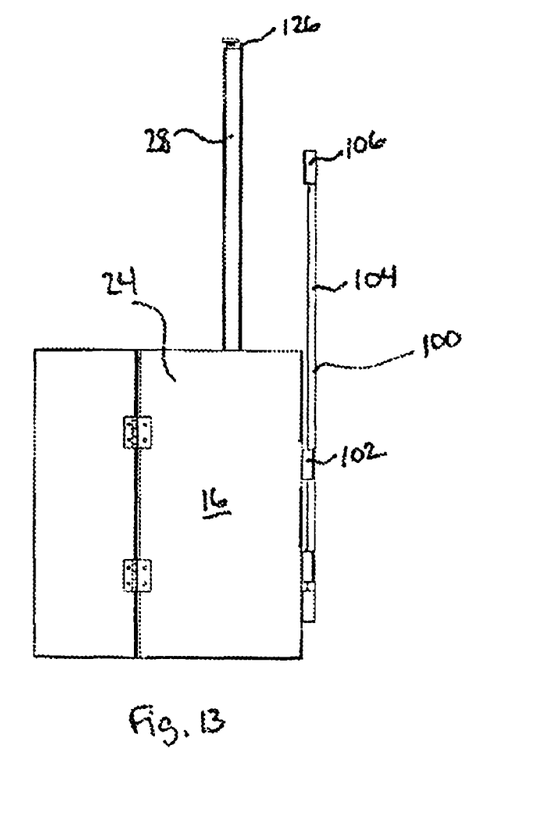
FIG. 13 is a side view of a storage assembly in one of the embodiments of the invention with the doors of the storage unit partially open.
Figure 14:
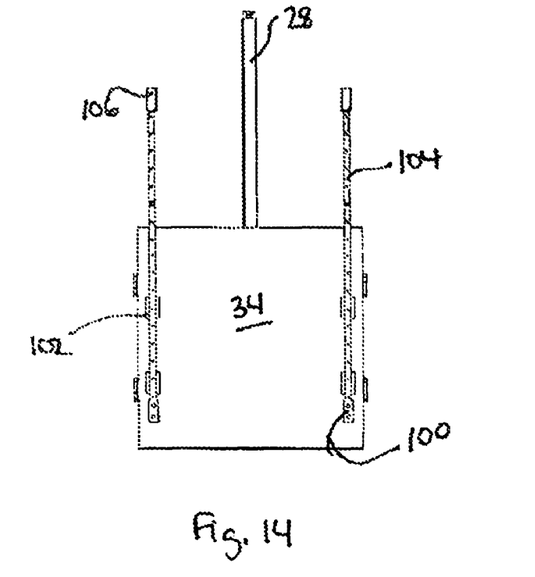
FIG. 14 is a back view of a storage assembly in one of the embodiments of the invention.

At least one guide assembly 26, and preferably at least two guide assemblies 26, 27, attaches to the storage unit 24, with the two guide assemblies 26, 27 preferably parallel and at the back 32. The guide assembly 26 has a guide rail 58 slidingly engaging a guide 60 that is attached to the storage unit 24. Each guide rail 58 preferably slidingly engages at least two guides 60. The guide rail 58 can be a rod 88 (FIGS. 2, 4-7) or a rectangular rail 104 (FIGS. 3, 13-14). The guides 60 allow the storage unit 24 to move smoothly on the guide rails 58.

End brackets 62 engage each end of the guide rail 58 and mount to the side wall 16 of the vehicle 10. The end brackets 62 can help prevent the storage unit 24 from sliding off the guide rails 58 in a rollover accident or if the linear actuator 28 fails.

Figure 11:
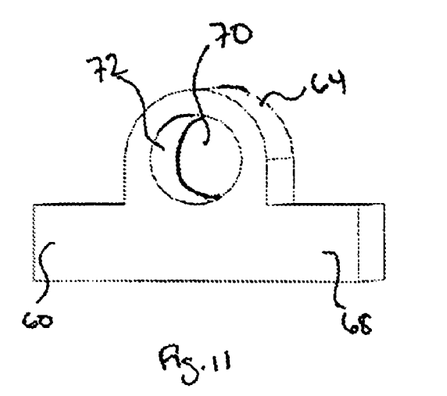
FIG. 11 is a perspective view of one of the guide collars.

As shown in FIG. 11, the guide 60 has a guide collar 64 extending from a rectangular guide base 68. The guide collar 64 has a guide bore 70 matingly engaging the guide rail 58, which is rod 88. The guide bore 70 preferably has a bearing surface surrounding its inner surface to ensure smooth motion along the guide rail 58. The bearing surface can be any material that allows smooth motion, such as bearings, bushings, a layer of plastic, such as acetal resins like DELRIN® (DuPont), and the like. The guide collar 64 typically has a dynamic load capacity greater than about 500 lbs. which enables the guide collars 64 to support the weight of the storage unit 24 and its contents in conditions up to 20 Gs.

Figure 10:
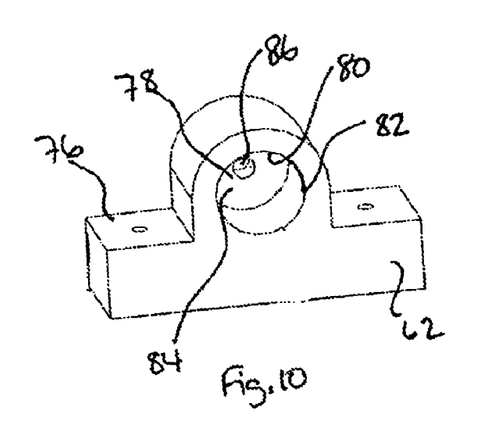
FIG. 10 is a perspective view of one of the end brackets.

Each end bracket 62 has a bracket tab 74 extending from a rectangular bracket base 76 and can be in a similar design configuration as the guide collar 64. (FIG. 10.) The bracket tab 74 has a mouth 82, an opposite bracket back wall 84 and a sidewall 80 extending from the bracket base 76 base between the mouth 82 and the bracket back wall 84. The bracket tab 74 has a cylindrical chamber 78 for matingly engaging one end of the guide rail 58, such as the rod 88. The chamber 78 is defined by the bracket sidewall 80, the mouth 82 and the bracket back wall 84. The bracket back wall 84 has a bracket aperture 86. One end of the rod fits through the mouth 82 and matingly engages the chamber 78. The end of the rod 88 can fasten to the end bracket 62 through the bracket aperture 86.

The guide assembly 26 is fastened to the storage unit 24 and the side walls 16 of the vehicle 10. The guide bases 68 of the guides 60 are fastened to the back 34 of the storage unit 24. The bracket bases 76 of the end brackets 62 are fastened to the side walls 16. Preferably, the vehicle side walls 16 have structural supports within, such as a frame or another reinforcement attached to the frame. The two guides 60 on each guide rail 58 can be spaced approximately 10 inches apart when attached to the back 34 of the storage unit 24 to create the smallest possible force on the guides 60 and guide rails 58 when used in a truck cab 12.

To work properly during movement, the guide rails must be well aligned. Installing the guide rails 58 onto the guides 60 and then attaching the guides 60 to the storage unit 24 before installing on the side wall 16 of the vehicle 10 can be difficult. The parallel guide rails 58 must be aligned either by hand or by using pre-drilled holes in the vehicle's side wall 16. If the guide rails 58 are misaligned, the guides 60 can bind on the guide rails 58.

Figure 9:
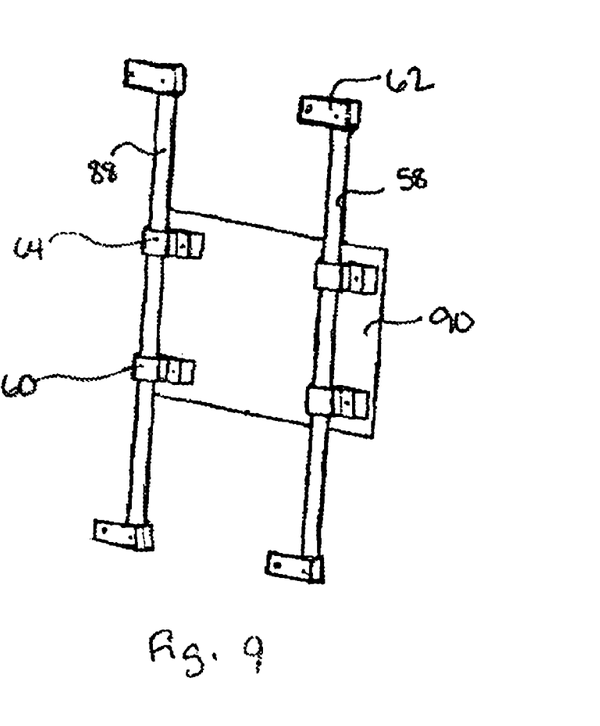
FIG. 9 is a perspective view of a guide back plate showing the arrangement of the guide and guide rails used when installed in a vehicle.

Backing plates 90, 92 can be used to ease the installation of the storage unit 26. The guides 60 can first attach to opposite sides of a guide backing plate 90. The use of a guide backing plate 90 helps align the guides 60 with respect to each other. By spacing guide holes in the guide backing plate 90 in the desired alignment, the guides 60 can be fastened to the guide backing plate 90. The guide backing plate 90 is then attached to the storage unit 24. By spacing guide holes in a bracket backing plate 92 in the desired alignment, the end brackets 62 can first fasten to a bracket backing plate 92. The bracket backing plate 92 is then attached to the side wall 16.

The use of backing plates 90, 92 make it easier to quickly assemble the storage assembly 22 in the vehicle 10 with the guide rails 58 parallel, reinforces the structures and reduces tolerance specifications. Because the backing plates 90, 92 allow the proper alignment of the guide rails 58 and guides 60, the storage unit 24 can move vertically without the guide rails 58 or guides 60 binding. The backing plates 90, 92 are preferably rectangular.

The minimum length of the guide rails 58 should be the total travel distance of the linear actuator 28 of the storage assembly 22 plus the length of the guide 60 spacing, typically about 10 in. for a truck cab. If the linear actuator 28 allows the storage assembly 22 a total travel distance of about 24 in., the minimum length of the guide rails should be about 34 in. (34 in.=24 in.+10 in.).

The guide assembly 100 shown in FIGS. 13 and 14 has guide engaging a rectangular guide rail 104. In this embodiment, the guide is a rectangular guide block 102. The guide block 102 and/or the guide rails 104 can have a bearing surface to allow smooth motion of the storage unit 24 on the guide rails 104. Examples of suitable guide blocks and guide rails include, low profile PTFE-lined plain bearing rails available from McMaster-Carr [#3102]. In this embodiment, the end brackets 106 are also rectangular and function as stop blocks when fastened at each end of the rail.

The guide rails 104 fasten to the side walls 16 of the vehicle 10. The guides 102 attach to the back 34 of the storage unit 24, such as with fasteners like bolts and nuts. End brackets 106 are fastened to the side walls 16 of the vehicle 10. The rectangular guide rails 104 can attach to the side wall 16 of the vehicle 10 at any point along the length of the guide rail 104. This type of guide rail 104, however, can be expensive as its rated dynamic load capacity increases. The guides 102 can be first fastened to a guide backing plate 90 and the end brackets 106 and guide rails 104 can be fastened to a bracket backing plate 92 as discussed previously.

Two vertical dividers 40, 41 are located within the storage unit 24. Each vertical divider 40, 41 is located between the linear actuator 28 and a sidewall 36, 37. The vertical dividers 40 and part of the top 30 and bottom 32 of the storage unit 24 define an actuator housing 42 to enclose part of the linear actuator 28, preferably the telescoping section. The bottom 32 of the storage unit 24 is preferably reinforced at the actuator housing 42 with a reinforcement 44 to provide extra weight bearing support. A front piece 46 can be used to hide the linear actuator 28 within the storage unit 24.

The linear actuator 28 has a first part 96 extending at least partially through the actuator opening 38 in the top 30 of the storage unit 24 and is located between the two vertical dividers 40, 41. The linear actuator 28 has a second part 97 located within the actuator housing 42. The linear actuator 28 can be a rod-type actuator 108 with a casing 110 surrounding at least part of the actuator rod 112. The casing 110 is preferably rectangular and can move freely between the top of the storage unit 24 and the ceiling 13. The telescoping components of the linear actuator 28 are preferably located within the actuator housing 42 in the storage unit 24, allowing the linear actuator 28 to freely extend and retract.

The linear actuator 28 fastens to a lower fixture 116 at the bottom and to an upper fixture 122 at the top. Both the lower and upper fixtures 116, 122 can be rated to withstand at least about a 10 G loading condition that can occur during a rollover accident.

Figure 15:
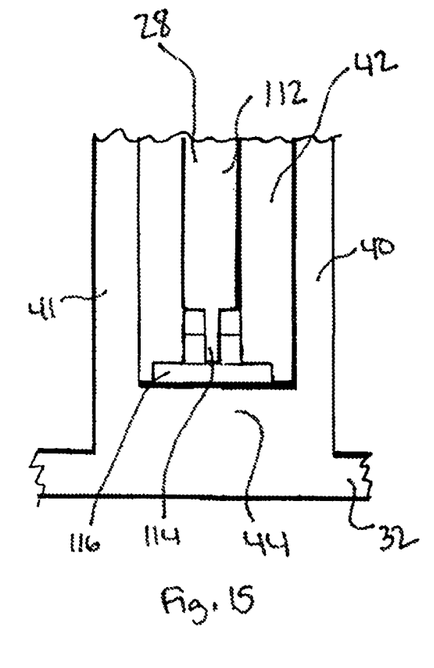
FIG. 15 is a partial front plan view showing the bottom of the linear actuator within the storage unit.
Figures 17, 18:
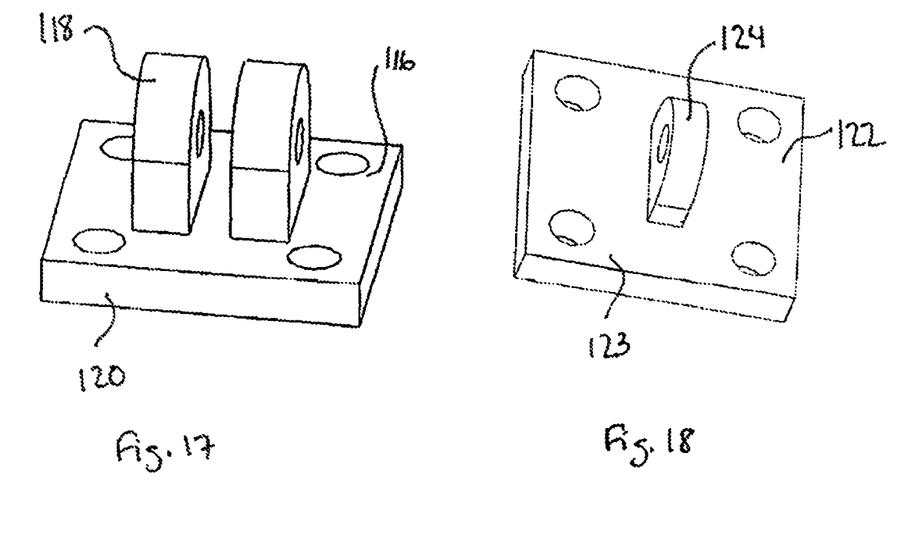
FIG. 17 is a perspective view of a lower mounting plate.
FIG. 18 is a perspective view of an upper mounting plate.

The lower fixture 116 mounts at or near the bottom 32 of the storage unit 24 within the actuator housing 42. The lower fixture 116 has a fixture clevis 118 projecting from a lower fixture mounting plate 120. The fixture clevis 118 has holes that align with a hole in an actuator tab 114 at the bottom of the actuator rod 112. The lower fixture mounting plate 120 mounts to the bottom 32 in the interior of the storage unit 24.

Figure 16:
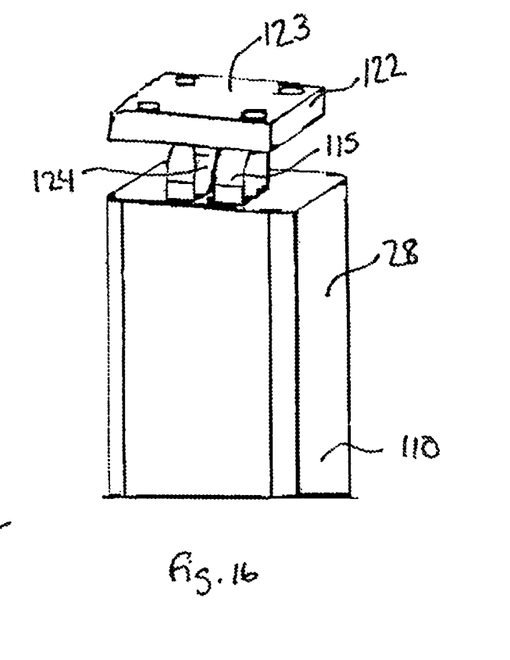
FIG. 16 is a partial perspective view of the top of the linear actuator with the top mounting plate attached.

The upper fixture 122 mounts to the ceiling 13 of the vehicle 10. The upper fixture 122 has an upper fixture mounting plate 123 from which a fixture tab 124 projects. The fixture tab 124 has an aperture which aligns with holes in an actuator clevis 115 at the top of the linear actuator 28. The upper fixture mounting plate 123 then mounts to the ceiling 13 of the vehicle 10, preferably by fastening with fasteners to a structural support within the ceiling 13.

The linear actuator 28 is preferably electrically powered and should be rated to lift at least about 200 lbs. to about 400 lbs. This rating can allow users to store clothing as well as small appliances in the storage unit 24s.

Figure 12:
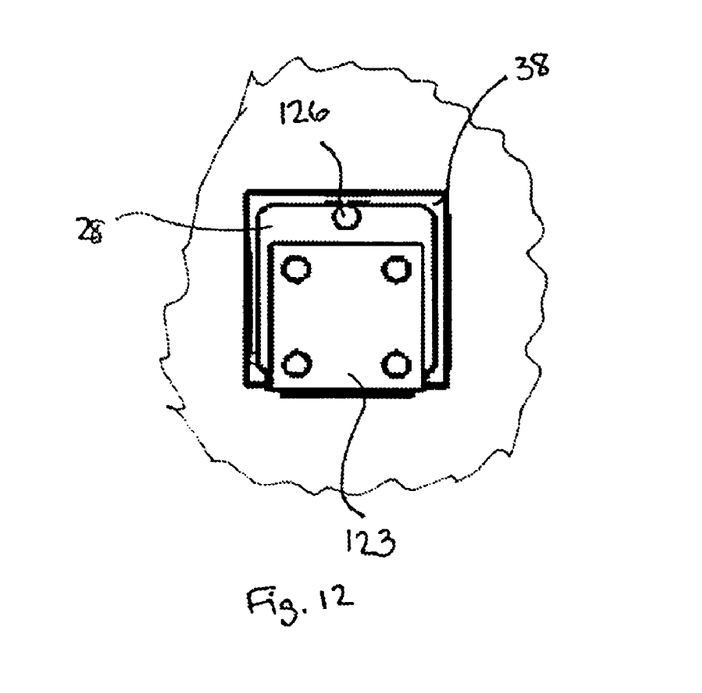
FIG. 12 is a close-up partial view of the top of a storage assembly in one of the embodiments of the invention showing the top of the linear actuator with an upper mounting plate attached.

Wiring 128 attached to an electrical connector 126 at the top of the linear actuator 28 can attach to a power source 130, such as a battery or the vehicle's electrical system. A linear actuator that runs on 12 volts DC can use a motor vehicle battery. Wiring 128 can run in the walls, behind panels in the vehicle's interior, such as the truck cab 12 or in conduit. The linear actuator 28 can be controlled by the user with a switch attached to the wiring.

The use of a electrically powered linear actuator 28 allows the user to lift the storage unit 24 with personal items at the touch of a button. When a battery is used, the storage assembly 22 can be moved when the engine has been turned off.

The actuator housing 42 divides the storage unit 24 into two separate compartments that can be used as a private storage system for two people. Each compartment can have adjustable shelving which can be arranged by the user. Shelving standards 48 vertically attach to inside faces of the sidewalls 36, 37 and the back 34 of each compartment. Shelving brackets 49 attach to each shelving standard 48. If the shelves 50 slide tightly into the shelving brackets 49, the shelves 50 should not move or rattle when items are stored on them.

Separate doors 52, 53 can be used for both compartments. Each door 52, 53 can swing open on one or more hinges 54. Each door 52, 53 can also have a locking handle 56. If the handle's lock is not used, the handle 56 should ensure the doors 52, 53 remain latched while the storage unit 24 is moving.

The ceiling of the motor vehicle is preferably reinforced where the storage assembly is attached. Extra support can be added to the internal structure of the ceiling of vehicle in order to support the weight of the storage units.

One or two storage assemblies can be used in a truck cab side wall between the airfoil shelving and the beds. For a truck cab, the storage assembly can be oriented with the width of the storage unit parallel to the beds. At least one inch of clearance on each side of the storage unit should be used. The storage unit located behind the driver's seat can be about 30 inches high, about 28.6 inches wide and about 15 inches deep.

The storage unit located on the side wall behind the passenger's seat can be about 30 inches high and about 15 inches deep, but may be narrower than the other storage unit to fit within the space. This difference in dimension allows the user to easily access the handle bar used to climb into the top bed. If the location of the handle bar is changed, a larger storage unit can be used.

Due to the high loads that will potentially be applied to the storage assembly, the entire storage assembly can be made of robust materials and manufactured with tight tolerances. The storage unit is made of a typical thermoplastic formed using injection molding. The plastic walls of the storage unit can be about $\frac{1}{8}$ in. thick and can be one continuous sheet of plastic. The material is sturdy, rigid and lightweight and does not add a large amount of weight to the vehicle. Since the storage unit will be loaded with a large amount of weight from stored items, the weight can cause the bottom of the storage unit to sag and deflect the sidewalls during a large acceleration, such as in tight turns or during hard braking. The storage unit can resist deformation with the inclusion of internal ribs on the storage unit surfaces.

If the storage assembly is added to the vehicle as an aftermarket customization, other items should be removed before installation. The guide rails are placed on the side wall first. The guides are installed on back of the storage unit next. Finally the storage unit with the linear actuator is placed onto the guide rails. If one of the guide rails wears out due to the extended or heavy usage, the presence of other components added after the installation of the storage assembly can make it difficult to replace. It is preferable to install the storage assembly prior to installing other items, and to keep the other installed items in the area modular and either snap-in or bolt on.

An advantage to the storage assembly of the invention is to increase the amount of useable space within the motor vehicle. If there is a small counter top space, for example, a moving storage unit would not only make use of previously unused space, but it would also give access to more "counter top space" in the empty space between a fixed lower storage unit and the upper, moveable storage unit.

The storage assembly of the invention is easily adjustable to fit the dimensions of the available space. In a smaller cab for example, the dimensions of the storage units, linear actuator, and the length of the guide rails can be decreased to fit within the smaller cab.

The storage assembly of the invention may also be useful in other applications, such as house/home storage units, or for storage in any confined area with high ceilings.

While the storage assembly can attach to a separate frame for support, the storage assembly can attach directly to the side walls of the vehicle, as well as to the structural supports in the ceiling.

Because the storage unit also has an internal actuator housing that surrounds the telescoping portions of the linear actuator, such as the actuator rod, the actuator housing forms a space free of the driver's belongings, such that the actuator can readily extend and retract. The actuator housing also allows for good serviceability by allowing the user to detach the linear actuator and remove a broken or malfunctioning part. The actuator housing is useful during assembly to help align the storage unit under the connection point of the linear actuator to the ceiling. The vertical dividers can also reinforce the storage unit.

EXAMPLE 1

Guide rods and guide collars were found safe using detailed analysis with computer modeling under all crash conditions, making them the optimal design for both reliability and cost. Computer modeling of the guide assembly was used to analyze the forces on the guide assembly during several critical loading conditions, frontal impact, side impact, rollover and vibration. The worst case scenario was represented by 20 G acceleration in frontal and side impacts and 10 G acceleration in a rollover. To have a complete analysis, the forces on the guide rail and guides were calculated in the highest loading locations. The storage assembly was therefore analyzed both in the extended/retracted locations as well as in the middle of the guide rails. The specific loading analyses are discussed in the following sections.

The primary components that were analyzed from calculations for a guide assembly with rods, guide collars and end brackets using 6061-T6 aluminum and the ultimate tensile stress used is 45 ksi.

Frontal Impact

Guide Shaft Analysis with Fully Retracted or Extended Cabinet

In the frontal impact condition, a truck cab experiences 20 G deceleration or acceleration, causing the storage unit to apply large forces and moments on the supporting guide rails. The 20 G acceleration causes a 200 lb. load within the storage unit to apply 4000 lbs. of force, labeled as FCG, based on F=ma.

This load was applied through the center of gravity of the storage unit which was assumed to be the center of the storage assembly. The moment created by the FCG was calculated as 30,000 lb-in. To counter this load, the guide rails were calculated to apply a force of 1290 lbs. The individual loads on the guide collars were calculated as one half of this at 645 lbs.

The highest loading capacity of the guide collars is not in the frontal impact in the fully extended/retracted condition, but the subsequent analysis of side impact discusses the maximum loading and the factor of safety of the guide collars.

The guide rails have two loading conditions that must be checked for yield and ultimate stress limitations. In a 20 G crash condition, the maximum allowable stress was the ultimate stress on the guide rails. This would allow permanent deformation but not fracture. A 1 G condition was used to calculate the potential operating loads in the truck cab and was analyzed using the yield stresses for any deformation during the loading would be elastic and the storage unit would still function after the loading.

Since the frontal impact loading creates a large moment and forces on the guide assembly, frontal impart was where the highest loading occurs for both the guide collars and the guide rails. The calculation of the highest loading for the guide collars was approximately 1200 lbs. The maximum shearing force at the end of the guide rails in the 20 G crash condition was about 2030 lbs. Using these values and assuming that the storage unit was completely retracted or extended, the safety factor on the guide shafts at 20 G was 2.14 with respect to the ultimate stress. The same analysis when the loading condition was the operational 1 G load showed that the safety factor of the guide rails was 7.5 with respect to yield stress and the elastic deformation was essentially negligible at only 0.005 in.

Guide Rail Analysis with the Storage Unit Located at the Center of the Guide Rails In this analysis, the loading condition was run using COSMOSXpress computer modeling to determine the maximum bending stresses in the 1 G and 20 G conditions. This analysis assumed that the storage unit was located in the middle of the guide rails when the frontal impact occurs. This center location is important as it signifies the highest bending stresses on the guide rails which were greater than the shearing stresses in this configuration.

The analysis showed the bending stresses were very large in this configuration and the safety factor dropped to 1.45 with respect to the ultimate stress of plastic deformation is acceptable, but fracture is not. The 1 G operational loading gave a safety factor of 5.1 with respect to the yield strength of the material. The highest loads on the guide rails were during this frontal impact loading and thus the guide rail safety factors do not need to be discussed any further.

Guide Collars and End Brackets

In a frontal impact of 20 G, the guide collars and end brackets were loaded with an approximately 1200 lbs load. The deformation produced in the COSMOSXpress simulation showed an exaggerated version of the stress distributions and deflections. A load of 1200 lbs applied to the bearing of the guide collar, led to the safety factor of 3.33 with respect to 6060-T6 yield stress.

The end brackets had a calculated shear force of 2030 lbs with the corresponding factor of safety of 1.81. From these results, the guide collars and end brackets are sufficiently strong to withstand the loads from a frontal impact collision and to resist any plastic deformation.

Side Impact

Guide Collars and End Brackets

In the side impact, the forces on the guide rails and guide collars are perpendicular to a plane created by the guide rails. This means that the forces push or pull the rails into or away from the side wall of the vehicle. With 20 G acceleration and an assumed load of 200 lbs, the storage unit should have 4000 lbs. force towards or away from the wall.

A quarter of this force or 1000 lb was calculated for the guide collars with a safety factor of 2.95. These forces were not the highest loads on the guide collars, but have a greater effect on the safety factor. Although the analysis showed the guide collars should not permanently deform, the guide collars were weaker in the side impact loading conditions than in the frontal impact conditions.

The end brackets were also weaker in side impact with a safety factor of 1.66. The highest loading condition of the end brackets was due to a maximum shear force from the top of the guide rails. In this case, it was due to the storage unit being fully retracted or fully extended that the calculated shear force at the end brackets was about 1704 lbs.

Rollover Impact

Guide Collars and End Brackets

The last loading condition considered was the rollover analysis, in which a truck cab would have a 10 G acceleration in the vertical direction. While the linear actuator would not likely survive this loading condition, the storage unit was assumed to be resting on the end brackets during this condition. At 10 G the total force on the storage unit was calculated as 2000 lbs. with 1000 lbs. on the end brackets and guide collars that restrain the storage unit's motion.

In the rollover condition, the end brackets and guide collars contact each other with a force of 1000 lbs. The load was removed from the guide rails and placed directly on the faces of the guide collars and end brackets. The rollover calculations of the stresses on the guide collars and end brackets performed in COSMOSXpress resulted in a safety factor 1.07 for the end brackets and a safety factor of 1.06 for the guide collars.

Thus the rollover condition is close to failure in terms of yield. If the forces are higher, yield would certainly occur, but the guide collars and end brackets would not fracture. While rollover is an extreme condition, the computer analysis shows that the storage assembly would remain intact.

Vibration Analysis

The excitation frequency on a truck cab is 8 Hz. A vibration analysis of the storage assembly was calculated to ensure that the excitation frequency of the truck cab would not excite the natural frequency of the storage unit. For safety, the natural frequency of the storage assembly should exceed the excitation frequency of the truck cab by a considerable amount.

The model used was a simple spring-mass system. The linear actuator was represented by the spring. The storage unit was represented by the mass.

The computer analysis showed the natural frequency of the storage assembly was much greater than the excitation frequency. The natural frequency was also large enough that if the excitation frequency reached this level, the amplitude of displacement should not be large enough to cause any damage. The storage assembly should not resonate during normal use and put the driver in danger.

EXAMPLE 2

One Linear Actuator, Two Guide Rails, Four Guide Blocks

Structural calculations were performed on the storage unit to measure the maximum loads on the main components. The maximum loads were calculated with respect to the highest loading condition which was been assumed to be acceleration twenty times the magnitude of gravitational acceleration.

This loading represents the effects of a crash, and as such the wall mounted storage assembly has been analyzed for head-on, side-impact and rollover crashes. The rollover crash assumes only a 10 G acceleration.

Additionally, an analysis was performed to calculate the natural frequency of the storage unit. This would indicate the critical frequency at which the wall mounted storage begins to rattle and shake violently due to the vibration from the truck's engine.

One critical aspect of the loading calculations was the position of the linear actuator through the center of gravity of the storage unit. This design feature simplified some of the calculations, and allowed the high strength, high capacity guide rails to bear the greatest loads. The following analysis was based on calculations of the storage unit mounted on two linear guide rails, with a total of four guide blocks, two per rail, and a 200 lb load placed within the box.

Frontal Impact

In frontal impact, the storage unit was held in the extended position and was nearly flush with the ceiling and its connection points. The maximum loading condition was a force, FCG, due to the 20 G acceleration. If the storage unit accelerated forward, both a lateral load and a moment would be applied on the connections of the storage unit.

For a frontal collision, an assumed 200 lbs of stored items in the storage unit would apply 4000 lbs of force, based on F=ma, on the storage unit through the center of gravity in a direction parallel to the rail plane. This force, labeled FCG, would act at the center of gravity which was assumed to be at the center of the storage unit. The total moment that FCG applied on the box was calculated as 30,000 lbs-in. The guide rails applied an equal moment in the opposite direction resulting in guide rail forces of approximately 1290 lbs. These guide rail forces were the forces that pull the rails away from the wall or push them into the wall. The use of two guide blocks per rail reduced the forces on each guide block to approximately 645 lbs. This was the total load at these locations, since the force from gravity acting on the box is directly resisted by the linear actuator and no additional moment is present.

The calculated loads were quite large due to the large accelerations experienced during a crash. The guide blocks and guide rails, however, exceeded these calculated loads by a significant amount. Using the manufacturer's dynamic load specifications rated to 3,102 lbs., this resulted in a safety factor of 2.40 for the guide rails, and a safety factor of 4.81 for the guide blocks. This suggested that this design should hold well during a frontal collision.

Side Impact

Side impact conditions occur when the acceleration of the truck is 20 G to the side. The force on the storage unit is directed towards the side of the truck.

At the highest side impact loading condition, the storage unit undergoes an acceleration perpendicular to the wall at 20 G. This acceleration corresponds to a lateral force of 4000 lbs. acting through the storage unit's center of gravity. In this laterally applied acceleration, the vertical force due to gravity is countered entirely by the linear actuator, and the lateral force is taken up by the guide rails and guide blocks. The calculated force in each of the guide rails reaches a maximum load of 2000 lbs. while the maximum load on the guide blocks only need to resist a corresponding 1000 lbs. each.

The analysis of the side impact configuration showed the calculated loads on the storage assembly were more than the loads from a frontal collision. The higher loading from a side impact was contained by the dynamic load capabilities of the guide rails and guide blocks. The calculated safety factor for the guide rails is 1.55 and for the guide blocks the safety factor was 3.10. Although the safety factor for the guide rails was reduced, it was still at a safe level as the 20 G load is a very high loading condition in itself.

Rollover Analysis

Another analysis to consider in a truck collision is the rollover case. In this situation the truck cab will overturn completely and internal cab features including the storage assembly may come loose and harm the driver or passenger.

In the case of a rollover, a 20 G force will act axially along the guide rails and the linear actuator. The linear actuator may not be able to withstand this force, and will no longer be able to hold the storage unit in place. This could happen if the axial force were strong enough to shear off all threads on the fastener. If this occurs during rollover, the storage unit would be able to freely move up and down the guide rails.

To prevent this dangerous event from occurring, vertical loading was considered. Vertical accelerations in the cab were expected, and the only component of the design that would resist these forces was the linear actuator. If the linear actuator is only rated to 400 lbs. with respect to tension and compression, greater forces would cause the linear actuator to fail and the storage unit will travel to one end of the guide rails or the other. At the end of the guide rails are end brackets, such as solid blocks of aluminum, to stop the storage unit from sliding off the guide rails. Because these end brackets are solid blocks, they were assumed to hold their shape when loaded by the storage unit, but the fasteners securing them would be under significant shear. The blocks themselves were 1.1"× 1.25"×3" in depth, width, and length and held in place with two steel bolts. The minimum diameter of the bolts was calculated to be about 0.206 inches using a shear yield strength of 30 ksi.

Vibration Analysis

A primary concern for vibration analysis is the natural frequency of the storage assembly during travel. The truck applies an input frequency of 8 Hz. If the storage unit system begins resonating at its natural frequency, a lot of noise and general rattling could occur.

A vibration analysis was performed by assuming the storage assembly to be a simple mass-spring system and that the linear actuator is the only support structure for the storage unit hanging below it. This assumption disregarded how the guide rails affect the vibration characteristics of the overall system, yet simplified analysis to provides an approximate figure for the nature frequency. According to the calculations, the natural frequency was 212.6 Hz and much larger than the 8 Hz frequency input from the truck's normal operation. This showed that the truck's operating frequency should not cause the storage system to vibrate wildly.

Rear Impact

The rear impact loading condition occurs when the acceleration of the truck is 20 G forward. The force on the storage unit is directed towards the rear of the truck. In this configuration the rear guides are placed under compression and carry part of the load, while the front guide rails no longer carry any of the loads.

The storage assembly of the invention increases the value of a truck cab to the user in terms of emotion, identity, and aesthetics by adding an improved storage system that would increase the amount of floor space. The extra storage would provide the user with the opportunity to move storage from a cluttered floor to the sides of the truck, therefore increasing the amount of usable space in the cab of the truck. Not only will this make the truck more comfortable, it will also give the driver more pride in his living space and in his job.

The storage assembly of the invention should improve the emotional worth of the living space provided by making the space seem more like a home. Because the driver can carry more things in the cab with him, the driver is able to bring personal items that normally would not be able to go in the truck. Increasing the storage space also allows the driver to store his or her clothing in one location as one would in a regular home. Additionally, the storage space will have the appearance of a regular cabinet found in a house, adding an even greater feeling of home.

The appearance of the storage unit blends well with the truck interior. Placing the additional storage units along the sides of the truck cab keeps them out of the way of the user. Since the user can now easily remove clutter from the floor, the cab becomes visually more appealing. This also has the effect of decreasing claustrophobia in the cab. Furthermore, adding locks to the doors of the storage units promotes the sense of privacy. A second unit can be placed on the other side of the cab to provide even more storage.

The ease of access to storage is greatly improved for the aging driver, and eliminates the need to move one's body in an awkward way to access storage. By using storage units that lower from the ceiling, the user only has to lift items to shoulder height. This is also an improvement over current under-the-bed storage, which requires the user to bend over to reach stored items.

Safety is also increased for the user because the cab's floor space has been cleaned up and stray items have been stored in the appropriate storage units. This leaves no chance for items to shift around and affect the driver's ability to operate the truck. The increased number of personal items allows the drivers to feel that they can customize their living space, thus giving them a sense of place and personality in the truck's environment.

Because the cost of living in the truck cab is cheaper than motel accommodations, a driver who can store more personal effects in the truck, will be more inclined to stay in truck rather than stay in a motel Locks can be used on the doors of the storage unit. These locks are also useful in keeping drivers' belongings private and separated from a second driver's belongings when both are living in the truck. If the locks on the doors are not used, the doors will remain latched even when the truck is in motion.

Currently, there is storage space on the side walls of the truck. Much of this storage space, however, is at a height along the wall that is hard for the average person to reach and organize. The storage assembly of the invention can be lowered to a height that makes access easy and effortless.

The current cab also has storage underneath the bottom bed. While this storage uses the space under the bed and is out of the way when not in use, it is also difficult to access, especially for the aging driver. Since it requires the driver to bend over and lift his/her belongings, a lot of strain is put on his/her back.

The storage assembly of the invention can also be out of the way of the driver when not in use, but lowered into a more accessible and ergonomic position when in use. If storing belongings becomes an easy and effortless process, then the driver will be more inclined to store all his/her possessions as opposed to leaving them lying on the floor. This has two main benefits: 1) the driver no longer has to worry about tripping over objects on a cluttered floor, and 2) the cab will appear bigger and more organized since it will not longer be cluttered.

While the invention is shown in only one of its forms, it is not thus limited but is susceptible to various changes and modifications without departing from the spirit and scope of the invention.

What is claimed is:

1. A moveable storage assembly for a vehicle having a ceiling, a bottom and side walls between the ceiling and bottom, comprising:
   a storage unit comprising a top, a bottom, a back and opposite sidewalls;
   a linear actuator attached to the ceiling and the storage unit; and
   a guide assembly having a guide attaching to the storage unit, a guide rail slidingly engaging the guide, and end brackets attaching to opposite ends of the guide rail and to the side walls of the vehicle.

2. A moveable storage assembly for a vehicle of claim 1, wherein the guide further comprises:
   a rectangular base;
   a guide collar extending from the rectangular base; and
   a guide bore in the guide collar matingly engaging the guide rail and having an inner surface.

3. A moveable storage assembly for a vehicle of claim 2, further comprising:
   a bearing surface surrounding the inner surface of the guide bore.

4. A moveable storage assembly for a vehicle of claim 3, wherein the end bracket further comprises:

a rectangular bracket base;

a bracket tab having a mouth, an opposite bracket back wall, a sidewall extending from the bracket base between the mouth and the bracket back wall; and a cylindrical chamber in the bracket tab engaging one end of the guide rail and being defined by the bracket sidewall, the mouth and the bracket back wall.

5. A moveable storage assembly for a vehicle of claim 4, wherein the bracket back wall further comprises:

a bracket aperture; and wherein the end of the rod fits within the chamber against the back wall and fastens through the bracket aperture.

6. A moveable storage assembly for a vehicle of claim 1, wherein the guide is a rectangular guide block and the guide rail is rectangular and fastened to the side wall of the vehicle.

7. A moveable storage assembly for a vehicle of claim 1, further comprising:

a guide backing plate fastening the guides to the storage unit.

8. A moveable storage assembly for a vehicle of claim 7, further comprising:

a bracket backing plate attaching the end brackets to the side wall of the vehicle.

9. A moveable storage assembly for a vehicle of claim 1, further comprising another guide assembly; and wherein the guide assemblies are parallel and attach to the back of the storage unit near each sidewall.

10. A moveable storage assembly for a vehicle of claim 9, further comprising:

an actuator hole in the top of the storage unit through which at least part of the linear actuator extends;

a lower fixture mounting to a bottom of the actuator and the bottom of the storage unit; and an upper fixture mounting to a top of the linear actuator to the ceiling.

11. A moveable storage assembly for a vehicle of claim 10, further comprising:

an upper fixture mounting plate;

an upper fixture tab projecting from the upper fixture mounting plate and being fastened to the linear actuator;

a lower fixture mounting plate; and a clevis projecting from the lower fixture mounting plate and being fastened to the linear actuator.

12. A moveable storage assembly for a vehicle of claim 11, further comprising:

two vertical dividers, each vertical divider being located between the linear actuator and one sidewall; and an actuator housing being defined by the vertical dividers, the top, and the bottom of the storage unit.

* * * * *